United States Patent [19]
Gerigk

[11] Patent Number: 5,794,508
[45] Date of Patent: Aug. 18, 1998

[54] STEERING VALVE

[75] Inventor: Hans-Willi Gerigk, Oberhausen, Germany

[73] Assignee: TRW Fahrwerksysteme GmbH & Co. KG, Dusseldorf, Germany

[21] Appl. No.: 889,282

[22] Filed: Jul. 8, 1997

Related U.S. Application Data

[63] Continuation-in-part of Ser. No. 626,483, Apr. 2, 1996, abandoned.

[30]     Foreign Application Priority Data

Feb. 22, 1996 [EP] European Pat. Off. ............ 96102701

[51] Int. Cl.⁶ .................................................. F15B 9/10
[52] U.S. Cl. ................................................ 91/375 A
[58] Field of Search ............................ 91/375 R, 375 A; 180/137; 137/625.21, 625.22, 625.23

[56]                References Cited

U.S. PATENT DOCUMENTS

| | | |
|---|---|---|
| 2,234,975 | 3/1941 | Newhart . |
| 4,177,714 | 12/1979 | Schluckebier ................. 91/375 A |
| 4,434,706 | 3/1984 | Bertin ............................ 91/375 A |
| 4,768,630 | 9/1988 | Aubry et al. . |
| 5,396,969 | 3/1995 | Joerg et al. .................. 91/375 A X |

FOREIGN PATENT DOCUMENTS

| | | |
|---|---|---|
| 0442570 | 8/1991 | European Pat. Off. . |
| 2592449 | 7/1987 | France . |
| 2755598 | 6/1978 | Germany . |
| 2833009 | 2/1979 | Germany . |
| 2918475 | 11/1980 | Germany . |
| 3302953 | 8/1984 | Germany . |
| 4023709 | 1/1990 | Germany . |
| 9113790 | 2/1991 | WIPO . |

*Primary Examiner*—Hoang Nguyen
*Attorney, Agent, or Firm*—Tarolli, Sundheim, Covell, Tummino & Szabo

[57]                ABSTRACT

In order to improve a steering valve of the relevant type such that it is of simple and economical design and without requiring increases in design length and so that it is not sensitive to rotational vibrations, a steering valve is designed to supply a servoelement with hydraulic pressure, consisting of an input shaft located in a housing, an output shaft, a centering spring element and a valve element, such that the steering valve has at least one chamber moving in a circular motion, essentially coaxial and supplied with hydraulic pressure, in which at least one piston element can move on an essentially circular path, where the chamber and/or the piston element form a portion of a bearing located between one of the shafts and the casing, or are connected axially parallel to it.

17 Claims, 2 Drawing Sheets

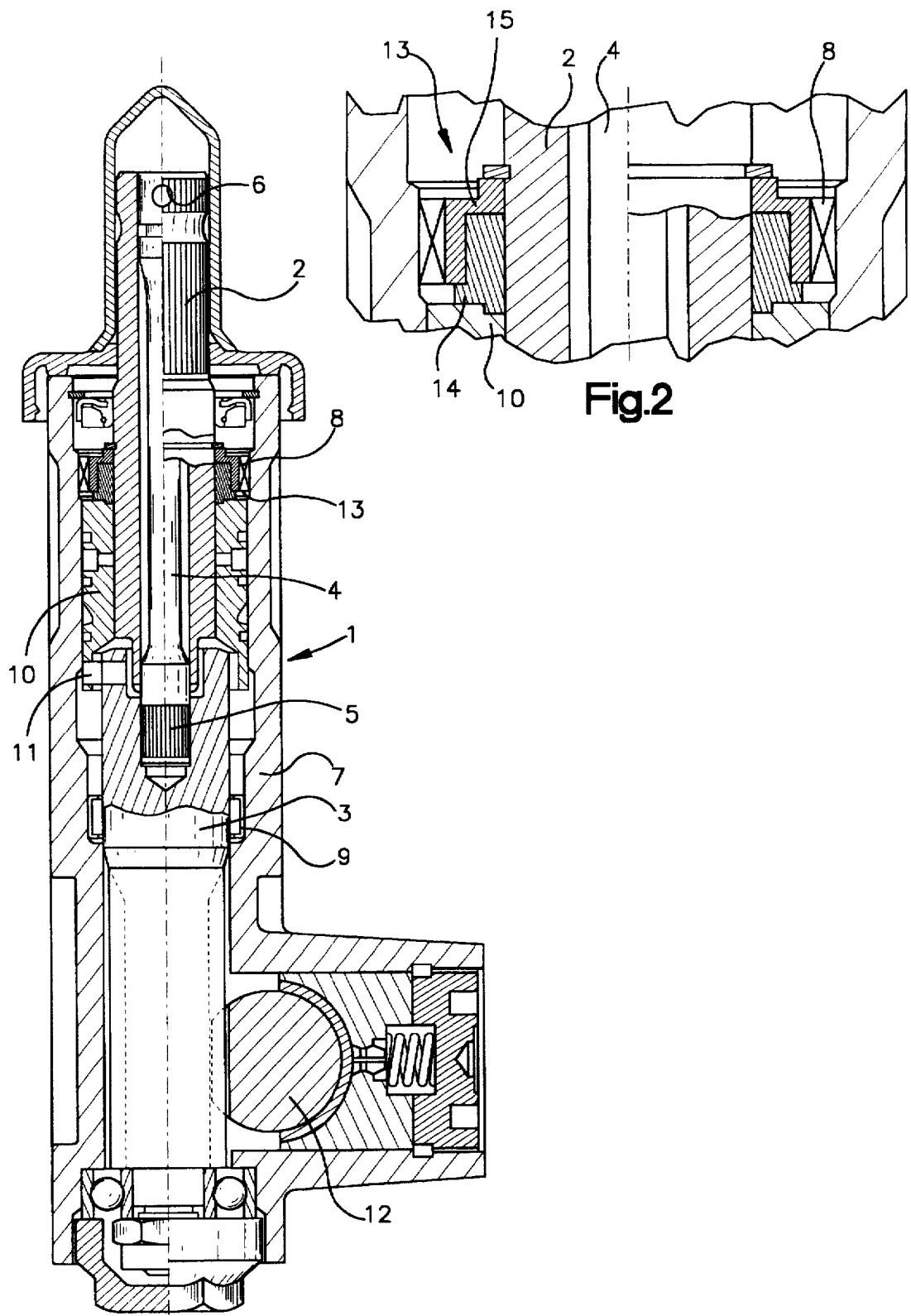

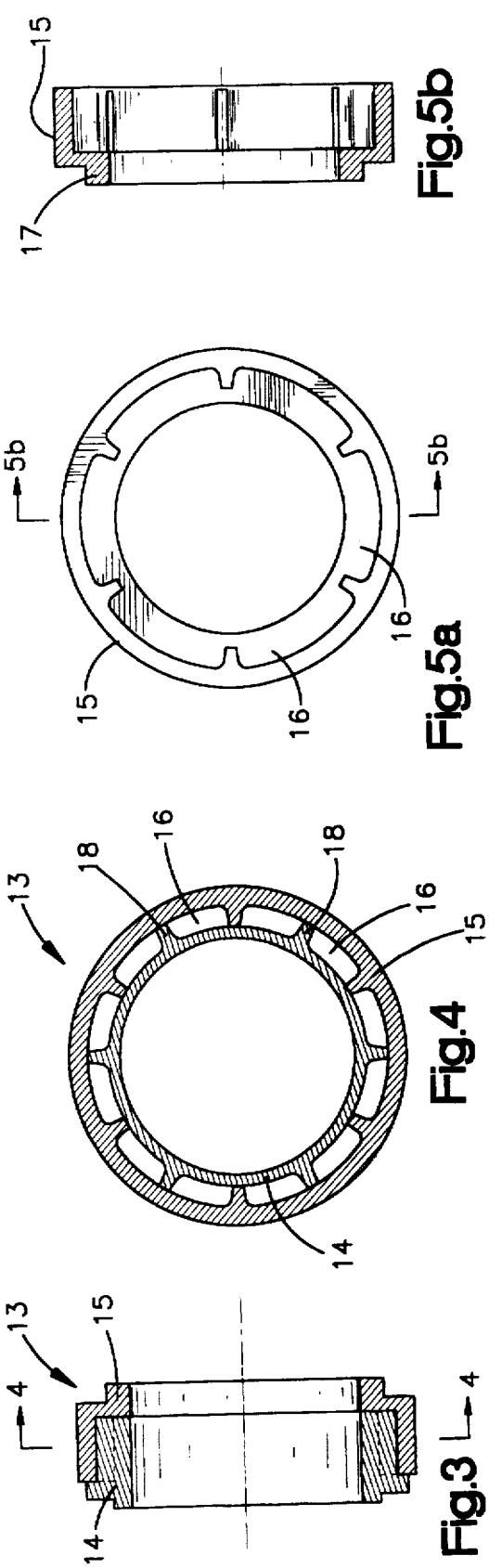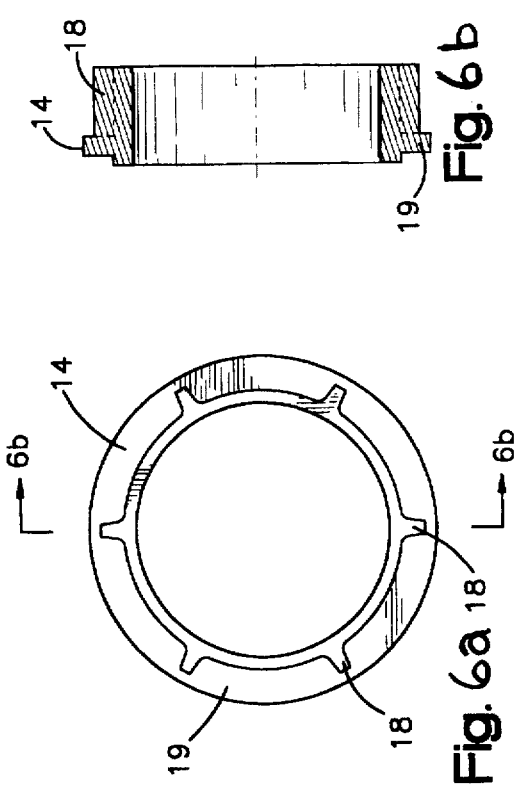

STEERING VALVE

This application is a continuation-in-part application Ser. No. 08/626,483 filed on Apr. 2, 1996 now abandoned.

The invention pertains to a steering valve for supplying hydraulic pressure to a servoelement and consists of an input shaft located in a housing, an output shaft, a centering spring element and a valve element.

Steering valves of this type are used in particular in power steering systems. The design of these power steering systems is already known. An input shaft connected with a steering tie rod is connected by means of a centering spring element to an output shaft equipped with a pinion. The pinion acts on the toothed rack of a steering unit. The use of steering valves is known for steering systems of this kind. In this case, in a known manner a rotary-vane valve element is used to connect or disconnect hydraulic guides ending in drill holes after a relative twisting of the input shaft with respect to the output shaft. Hydraulic fluid is pumped through the system under pressure by a pump. After a relative twisting of the input shaft with respect to the output shaft, hydraulic pressure is supplied to a hydraulic motor which supports the movement of the toothed rack in one of the two possible directions.

Activation of steering valves of this kind takes place through torsion of the input shaft with respect to the output shaft, wherein a torsion moment must be overcome by the centering spring element, e.g., a torsion rod, located between them.

In one type of steering valve, a valve casing is provided in a known manner, which engages with the output shaft and surrounds the input shaft. This valve casing features control grooves that can be moved to coincide with holes for hydraulic fluid running in from outside the housing.

Another type of steering valve is known, where essentially axially positioned holes are brought to coincide with each other.

A known problem with steering valves of this type is the matter of torsional vibrations. These vibrations result primarily from road surface vibrations transferred from the vehicle's tires, and also from pressure pulsations which are noticed as a trembling, relative motion between the input shaft and the output shaft or valve element. This may result in shaking of the steering wheel in the steering system and also produces troublesome noise.

A number of solutions are known in the state of the art in order to counteract this problem. In WO91/13790 a special expanding hose system is proposed in order to compensate the pressure pulsations. In DE 2,755,598 A1 it is proposed to add air to the hydraulic medium. The supplemental inclusion of damper volumes is proposed in DE 4,023,709 A1. Finally, DE 2,918,475 A1discloses the use of a hydraulic motor between the pump and steering valve.

Due to these proposed designs, known steering systems have become more complicated with regard to material requirements and the assembly and adjustment work and can only be manufactured with great financial expense. Additional assemblies are needed, all of which are located outside of the steering valve and nonetheless do not entirely and fundamentally prevent the torsional vibration.

Often, polymer rings which can usually be impinged with system pressure are placed between the valve components, control casing and input shaft which are moving relative to each other. Through Coloumb friction, a frictional moment can be produced between the valve components moving relative to each other and which act to damp the torsional vibrations. This design has the disadvantage that Coloumb friction adversely affects the valve characteristics, and furthermore, components in the shape of polymer rings are used that can change their characteristics due to wear and material aging over the lifespan of the steering mechanism.

Furthermore, U.S. Pat. No. 4,352,304 describes the design of a viscous damping of the steering column. The pinion and input shaft are connected to a rotationally designed element, such that gaps are formed relative to each other, in the circumferential direction of the shaft axis, and said gaps are filled with a viscous fluid. In case of relative rotational vibrations of the two shafts, and thus of the two gap-forming elements to each other, gravitational forces act on the viscous fluid located in the gaps that act on the surface of the elements, producing damping moments. In order to successfully damp the strong instabilities, as required in the present case, with the principle of fluid shear, gap surfaces of an unfeasible size are needed.

In DE 2,833,009 A1 a design is disclosed in which a Coloumb friction force is produced on/in the circumferential direction around the valve axis-oriented cylinder surfaces to damp "shaking vibrations" due to pressurized radial pistons. This damping principle is also based on the Coloumb friction forces negatively affecting the valve characteristic.

It was already suggested to provide chambers impacted with hydraulic pressure, in which piston elements can move, whereby the chamber and piston element are connected each with another relatively twisting element. Thus, the additional use of a damper is proposed, but an increase in the structural length is the result, which means disadvantages with regard to cost, but also with regard to the installation size. The design length is a sensitive parameter in the case of steering servovalves.

Proceeding from the foregoing, the problem of the present invention is to refine a steering valve of the type described above such that it is simple and economical to build, does not increase the design length and is not sensitive to rotational vibrations.

As a technical solution to this problem, the generic steering valve is refined in that the steering valve has at least one chamber moving in a circular motion, essentially coaxial and supplied with hydraulic pressure, in which at least one piston element can move on an essentially circular path, where the chamber and/or the piston element form a portion of a bearing located between one of the shafts and the casing.

With the design according to this invention, a simply designed torsional-vibration balancer is provided on a steering servovalve of the generic kind. The latter consists of at least one circular chamber and a piston element moving therein on an essentially circular path. The chambers are filled with viscous fluid, preferably with the transmission oil used. Torsional vibrations are damped by the pressure buildup in the chamber resulting from the relative motion of the piston and chamber element and a resultant force applied to the piston and thus by a moment applied to the input shaft which is directed opposite the orientation of the torsional vibration. "Directly or indirectly connected with the elements" means that additional elements can be located between them. The input shaft is preferably seated by one of the two damper units by means of a bearing, so that, for the bearing and torsional-vibration balancer, a quasi-integrated design is described. The chambers and the piston are integrated in one of the bearings needed anyway for the input shaft or in the output shaft, or are arranged axially parallel, so that no increase in structural length is needed due to the use of an additional damper. "Integrated" in the sense of the present invention means that the damper system is located in the bearing or is axially parallel to it, but without losing the bearing properties.

The integration or axial parallel provision of the torsional-vibration balancer in or to a bearing does not necessarily mean that a commercial bearing is modified with a torsional-vibration balancer of the invented type, but rather it is within the realm of the invention when an element forming the chamber and a piston-bearing element with additional elements can be mounted on a torsional-vibration balancer which is also provided with bearing properties between one of the shafts and the housing. Also, a chamber element and piston element can be seated with respect to each other so that the entire component can perform its function as a bearing as well as a torsional-vibration damper.

It is also essential for the present invention that the damping properties of the invented torsional-vibration balancer do not depend on the system pressure prevailing in the steering valve, but rather on the geometric design of the damper units, in particular their gap widths and actuator surfaces, as well as on the torsional-vibration frequency and amplitude, and the viscosity or density of the damper fluid. Ideally, the annular cylinder and annular piston elements form a sealed system, so that the fill fluid will flow through the leakage gap between the piston and cylinder element due to the pressure increase in the diminishing chamber and flow from it into the enlarging chamber after a relative torsion between the two damper elements. The differing pressure buildup in the chambers exerts a force on the piston elements, which exerts a moment on the input shaft with respect to the valve axis, which is directed in the direction opposite the instabilities and thus damps them. For a simpler filling of the damper chamber with viscous fluid, an initial filling of the chamber with steering fluid can be used through the leakage gap between the annular cylinder and annular piston element to the outside. However, the leakage stream remaining in future operation and possible tolerance-related leakage stream reduces the damping capacity, which is undesirable in principle. The actuator principle of the torsional-vibration balancer presented here is thus purely hydraulic, and even in a relatively high-frequency deflection of its parts, it operates with applied pressure; thus it acts independently of the steering mechanism operating pressure and the steering valve control processes. Its advantage is a high damping capacity that does not affect the valve characteristics.

According to one favorable proposal of the invention, at least one chamber supplied with hydraulic pressure is an annular chamber. It is preferably divided into several sections so that a number of annular chambers are formed. These can all be designed the same or different. The one piston element is designed according to a favorable design of the invention in the form of a radial web on a ring. Both the annular chamber and also the radial webs are designed preferably as annular elements. It is a particular advantage when the annular elements are designed like a bushing, whereby the chamber element and the web element can be inserted into each other. It is also proposed that one of the bushings is attached to the input shaft. In case the related steering valve has its own valve element in the form of a valve casing, according to one proposal of the invention, the other bushing is attached to the valve casing.

The annular cylinder element formed in the described manner can thus be used as a torsional-vibration balancer. Furthermore, when using a fluid with controllable, variable viscosity, the annular cylinder element can be used alternatively or additionally as a reaction and/or centering element, since the produced reaction moment is also a function of the viscosity of the fluid.

In this regard it would be possible to use an electrorheologic fluid.

The invention will supplement a related steering valve by a simply designed and mountable device, which in particular makes the steering valve insensitive to interferences such as torsional vibrations.

Additional advantages and properties of the invention are obtained from the following description with reference to the figures. These figures show:

FIG. 1: A cross section of a sample design of a steering valve;

FIG. 2: An enlarged view of a portion of the steering valve shown in FIG. 1,

FIG. 3: A cross section of a sample design of an annular cylinder element;

FIG. 4: A cross section along line 4—4 in FIG. 3;

FIG. 5a: A presentation of a sample design of an annular chamber;

FIG. 5b: A cross section along line 5b—5b in FIG. 5a;

FIG. 6a: A presentation of a sample design of an annular piston element; and

FIG. 6b: A cross section along line 6b—6b in FIG. 6a.

The steering valve 1 shown in FIG. 1 consists of an input shaft 2 and an output shaft 3, which in the illustrated example are connected by a torsion bar 4 to move relative to each other as a function of the rigidity of the torsion bar. The torsion bar 4 is inserted into the output shaft 3 in the connecting region 5 and by a pin with the input shaft 2 in the connecting region 6. The device is inserted into a housing 7 and is rotary mounted by means of bearings 8 and 9. The input shaft 2 is connected to a steering column/wheel (not shown). A valve casing 10 surrounds the input shaft 2 and is connected to the output shaft in the connecting region 11. After a relative motion of the input shaft 2 relative to the output shaft 3 and also to the valve casing 10, control grooves are moved relative to each other so that hydraulic pressure is sent to a hydraulic motor (not shown). The output shaft 3 is also engaged with a toothed rack linkage 12 (not shown).

Parallel to the bearing 8 or integrated into it, there is an annular cylinder element 13, which is shown in detail in FIG. 2. An annular piston element 14 is attached, by press fitting or another suitable means in a rotationally fixed manner with the control casing 10 or is even integrated into it, whereas an annular chamber element 15 is attached, by press fitting or another suitable means, in a rotationally fixed manner to the input shaft and thus the input shaft is braced via the damper element by means of the bearing 8 at the housing.

The individual elements of the annular cylinder element 13 are presented in FIGS. 3–6.

The annular cylinder element 13 consists of the annular piston element 14 and the annular chamber element 15. The annular piston element 14 is designed in the form of an annular element which features radially protruding pistons 18. In addition, a cover-like expansion 19 is provided which forms a wall of the annular cylinder element 13.

The annular chamber element 15, in turn, features a number of chambers 16 that are incorporated into the ring. A base 17 extends in the axial direction for connecting the chamber element 15 with the input shaft 2 and/or the piston element 14 with the valve casing 10. In the design example, a total of six chambers 16 and six pistons 18 are used. The chamber element 15 and the piston element 13 fit together to form a plurality of interdigitated portions, as shown in FIG.

4, so that a total of six annular cylinders are produced. Each is filled with viscous fluid, so that after the smallest, but high-frequency deflection of the input shaft and/or of the piston, a reaction pressure builds up in the cylinder due to the incompressibility of the fluid damping the torsional vibration. After a low-frequency deflection in the cylinders, like that in a common steering motion, due to the leakage gaps which are formed along a circumferential flow path defined between each chamber and piston and possibly to its surroundings, no significant reaction pressure occurs that could adversely affect the functional operation of the steering valve. The annular cylinder element formed in the described manner can thus be used as a torsional-vibration balancer. Furthermore, when using a fluid with controllable, variable viscosity, the annular cylinder element can be used alternatively or additionally as a reactive and/or centering element, since the produced reaction moment has the function of the viscosity of the fluid.

In the present example, the damper device is integrated into the bearing 8 of the input shaft; however, other positions may also be suitable, provided no increase in design length will result and additional bearing positions are already provided.

REFERENCE LIST

1 Steering valve
2 Input shaft
3 Output shaft
4 Torsion bar
5 Connecting region
6 Connecting region
7 Housing
8 Bearing
9 Bearing
10 Valve casing
11 Connecting region
12 Toothed rack
13 Annular cylinder element
14 Annular piston element
15 Annular chamber
16 Chamber
17 Base
18 Piston
19 Cover

We claim:

1. A steering valve for supplying hydraulic fluid to a servo-element, the steering valve comprising:
   an input shaft;
   an output shaft;
   a spring element connecting said input shaft to said output shaft;
   a valve casing surrounding said input shaft and connected to said output shaft;
   a housing surrounding said valve casing; and
   bearing means disposed between said input shaft and said housing;
   said bearing means including means for dampening torsional vibration, said means comprising a ring-shaped piston element and a ring-shaped chamber element, said chamber element and said piston element being disposed coaxially and concentrically and being relatively rotatable one of said elements being attached to said input shaft and the other of said elements being attached to said valve casing, said bearing means further including an annular bearing member between one of said elements and said housing permitting relative movement of said one element and said housing;
   said chamber element and said piston element defining a series of chambers spaced circumferentially around said input shaft, each of said chambers having incompressible fluid therein;
   each of said chambers being defined in part by interdigitated portions of said chamber element and said piston element which interdigitated portions are movable circumferentially of said input shaft and relative to each other.

2. The steering valve of claim 1 wherein said incompressible fluid flows from at least one chamber in said series of chambers to an adjacent chamber in said series of chambers in a circumferential flow path defined by one of said interdigitated portions and one of said chamber element and said piston element during low frequency relative rotation of said chamber element and said piston element.

3. The steering valve of claim 2 wherein, upon high frequency relative rotation of said chamber element and said piston element, a reaction pressure builds up in said series of chambers in a direction which is opposite the direction of the relative rotation to dampen the high frequency relative rotation.

4. The steering valve according to claim 1 wherein said chamber element and said piston element comprise bushings that are nested one inside the other.

5. The steering valve according to claim 1 wherein said chamber element is attached to said input shaft.

6. The steering valve according to claim 1 wherein said piston element is attached to said valve casing.

7. The steering valve according to claim 1 wherein said fluid in said cylinder element is a viscous fluid.

8. The steering valve according to claim 1, wherein said fluid in said cylinder element has a controllable, variable viscosity.

9. A steering valve for supplying hydraulic fluid to a servo-element, the steering valve comprising:
   an input shaft;
   an output shaft;
   a spring element connecting said input shaft to said output shaft;
   a valve casing surrounding said input shaft and connected to said output shaft;
   a housing surrounding said valve casing; and
   an annular bearing disposed between said input shaft and said housing;
   said bearing including means for dampening torsional vibration, said means comprising a ring-shaped chamber element encircling said input shaft and a ring-shaped piston element encircling said input shaft, said chamber element and said piston element being disposed coaxially and concentrically and being relatively rotatable;
   said chamber element and said piston element defining a series of chambers spaced circumferentially around said input shaft, said series of chambers being isolated from the hydraulic fluid in the steering valve, each of said series of chambers having incompressible fluid therein;
   each of said series of chambers being defined in part by interdigitated portions of said chamber element and said piston element which are movable circumferentially of said input shaft and relative to each other to cause said incompressible fluid to flow from at least one of said series of chambers to an adjacent one of said chambers in a flow path defined by one of said interdigitated portions and one of said chamber element and said piston element.

10. The steering valve of claim 9 wherein said incompressible fluid flows along said flow path from said at least one of said series of chambers to said adjacent one of said series of chambers during low frequency relative rotation of said chamber element and said piston element.

11. The steering valve of claim 10 wherein, upon high frequency relative rotation of said chamber element and said piston element, a reaction pressure builds up in said series of chambers in a direction which is opposite the direction of the relative rotation to dampen the high frequency relative rotation.

12. The steering valve according to claim 9 wherein said chamber element and said piston element comprise bushings that are nested one inside the other.

13. The steering valve according to claim 9 wherein said chamber element is attached to said input shaft.

14. The steering valve according to claim 13 wherein said annular piston element is attached to said valve casing.

15. The steering valve according to claim 9 wherein said fluid in said cylinder element is a viscous fluid.

16. The steering valve according to claim 9 wherein said fluid in said cylinder element has a controllable, variable viscosity.

17. The steering valve according to claim 5 wherein said chamber element and said piston element form a closed and sealed fluid system.

* * * * *